US007308578B2

(12) United States Patent
Keohane et al.

(10) Patent No.: US 7,308,578 B2
(45) Date of Patent: Dec. 11, 2007

(54) METHOD AND APPARATUS FOR AUTHORIZING EXECUTION FOR APPLICATIONS IN A DATA PROCESSING SYSTEM

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 10/383,844

(22) Filed: Mar. 6, 2003

(65) Prior Publication Data

US 2004/0177249 A1 Sep. 9, 2004

(51) Int. Cl.
  *H04L 9/00* (2006.01)
  *H04K 1/00* (2006.01)
  *G06F 15/16* (2006.01)
(52) U.S. Cl. .................. 713/181; 713/175; 713/179; 726/10
(58) Field of Classification Search .............. 726/2, 726/4, 26, 27; 713/156
See application file for complete search history.

(56) References Cited

U.S. PATENT DOCUMENTS 6,092,194 A * 7/2000 Touboul ................ 726/24
6,463,535 B1 * 10/2002 Drews ................... 713/176
2004/0139202 A1 * 7/2004 Talwar et al. ........... 709/229
2004/0181469 A1 * 9/2004 Saeki .................... 705/30
2005/0166041 A1 * 7/2005 Brown ................... 713/150
2005/0177495 A1 * 8/2005 Crosson Smith ......... 705/39
2005/0177521 A1 * 8/2005 Crosson Smith ......... 705/67
2005/0240765 A1 * 10/2005 Genty et al. ............ 713/175
2006/0265371 A1 * 11/2006 Edmond et al. ........... 707/7
2006/0265401 A1 * 11/2006 Edmond et al. .......... 707/10
2006/0265402 A1 * 11/2006 Edmond et al. .......... 707/10
2006/0265436 A1 * 11/2006 Edmond et al. ......... 707/204

FOREIGN PATENT DOCUMENTS

| CA | 2496732 | * | 1/2005 |
| WO | WO 98/21683 | | 5/1998 |
| WO | WO 00/72149 A1 | | 11/2000 |
| WO | WO 02/33525 A2 | | 4/2002 |

\* cited by examiner

*Primary Examiner*—Christopher Revak
(74) *Attorney, Agent, or Firm*—Duke W. Yee; Diana R. Gerhardt; Wayne P. Bailey

(57) ABSTRACT

A method, apparatus, and computer instructions for authorizing execution of an application on the data processing system. A request is received to execute the application, wherein the request originates from a remote data processing system and wherein the request includes a digital certificate and the application. The digital certificate is verified in response to receiving the request. Responsive to verifying the digital certificate, a digital digest is calculated for the application to form a calculated digital digest. The calculated digital digest is compared with a set of digital digests from a trusted source. The application is executed if a match between the calculated digital digest and set of digital digests occurs.

20 Claims, 3 Drawing Sheets

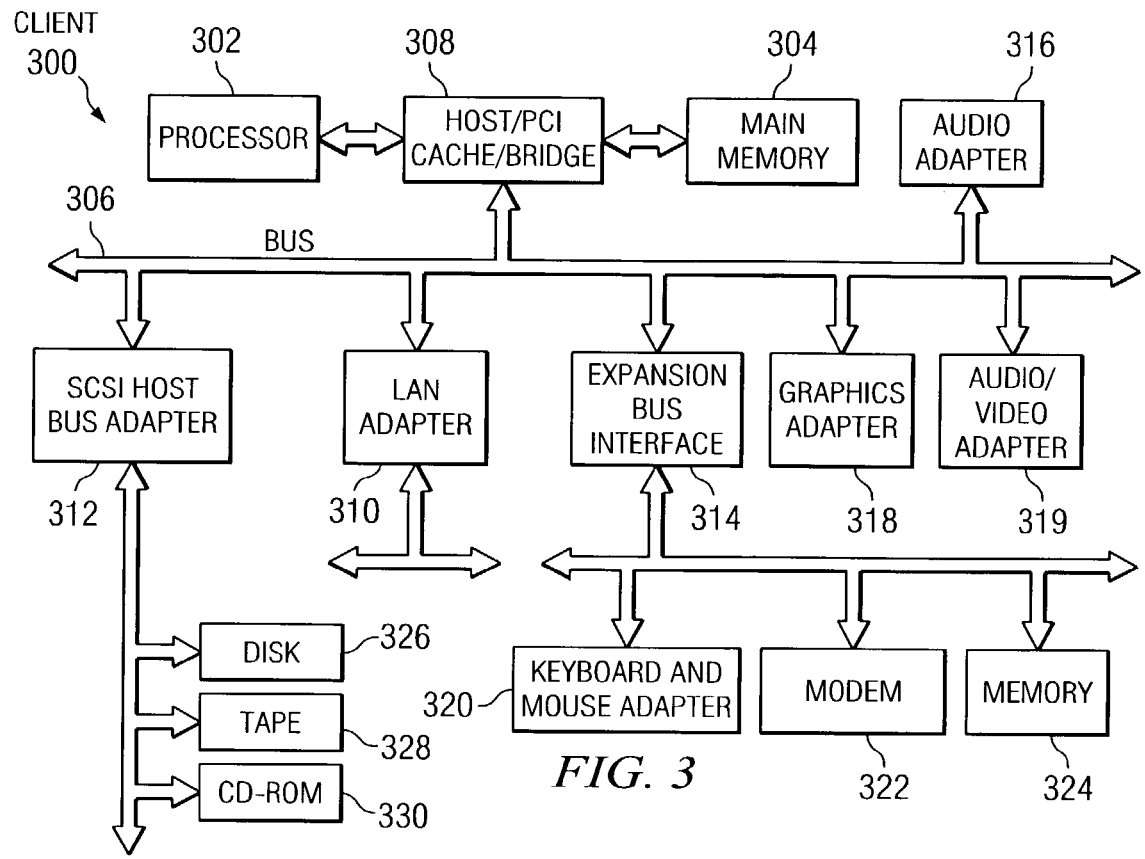
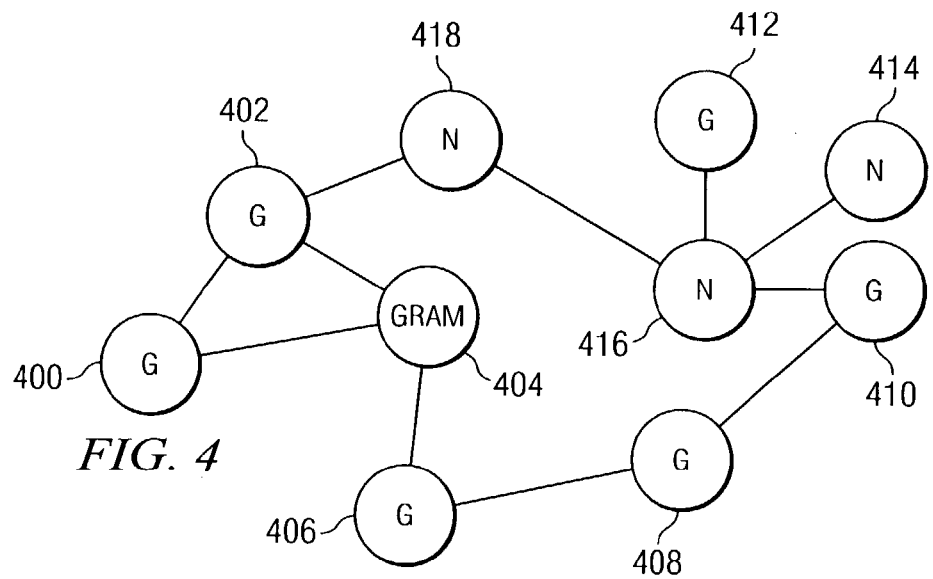
FIG. 3
FIG. 4

METHOD AND APPARATUS FOR AUTHORIZING EXECUTION FOR APPLICATIONS IN A DATA PROCESSING SYSTEM

BACKGROUND OF THE INVENTION

1. Technical Field

The present invention relates generally to an improved data processing system and in particular to an improved method and apparatus for processing data. Still more particularly, the present invention provides a method and apparatus and computer instructions for authorizing execution of applications by nodes in a grid.

2. Description of Related Art

Network data processing systems are commonly used in all aspects of business and research. These networks are used for communicating data and ideas as well as providing a repository to store information. Further, in many cases the different nodes making up a network data processing system may be employed to process information. Individual nodes may have different tasks to perform. Additionally, it is becoming more common to have the different nodes work towards solving a common problem, such as a complex calculation. A set of nodes participating in a resource sharing scheme is also referred to as a "grid" or "grid network". For example, nodes in a grid network may share processing resources to perform a complex computation, such as deciphering keys.

The nodes in a grid network may be contained within a network data processing system, such as a local area network (LAN) or a wide area network (WAN). These nodes also may be located in different geographically diverse locations. For example, different computers connected to the Internet may provide processing resources to a grid network. By applying the use of thousands of individual computers, large problems can be solved quickly. Grids are used in many areas, such as cancer research, physics, and geosciences.

Security is a concern within grid networks. One particular concern is the execution of malicious applications of nodes in a grid. Currently, digital certificates are employed to authorize a remote user and node to execute on a node in the grid. With this process, a user obtains a digital certificate. In requesting execution of an application on a node, the user signs on with a pass-phrase, attaching a digital certificate, which will be associated with all programs that the user attempts to execute. Next, an application is selected from a grid resource application manager for execution. Further, one or more remote nodes are selected to execute the application. Additionally, other remote resources also are selected. For example, these remote resources may be disk space or databases.

Thereafter, the application and the digital certificate are sent to the node or nodes for execution. Prior to execution of the application, the node checks this digital certificate with a certificate authority. A certificate authority is an entity that is authorized to issue certificates. If the certificate passes the check, the application is then executed.

One problem with this security mechanism is that this model does not account for a stolen user's pass-phrase. Once a pass-phrase is stolen, a hacker may execute a malicious program to implant a Trojan Horse on resources throughout the grid. Grids are particularly enticing to hackers because of the distributed nature of grids. With a Trojan Horse, a hacker may access any node, bypassing the grid security.

Therefore, it would be advantageous to have an improved method, apparatus, and computer instructions for authorizing execution of applications in a network data processing system.

SUMMARY OF THE INVENTION

The present invention provides a method, apparatus, and computer instructions for authorizing execution of an application on the data processing system. A request is received to execute the application, wherein the request originates from a remote data processing system and wherein the request includes a digital certificate and the application. The digital certificate is verified in response to receiving the request. Responsive to verifying the digital certificate, a digital digest is calculated for the application to form a calculated digital digest. The calculated digital digest is compared with a set of digital digests from a trusted source. The application is executed if a match between the calculated digital digest and set of digital digests occurs.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 4 is a diagram illustrating components in a grid in accordance with a preferred embodiment of the present invention;

DETAILED DESCRIPTION OF THE PREFERRED EMBODIMENT

Figure 1:
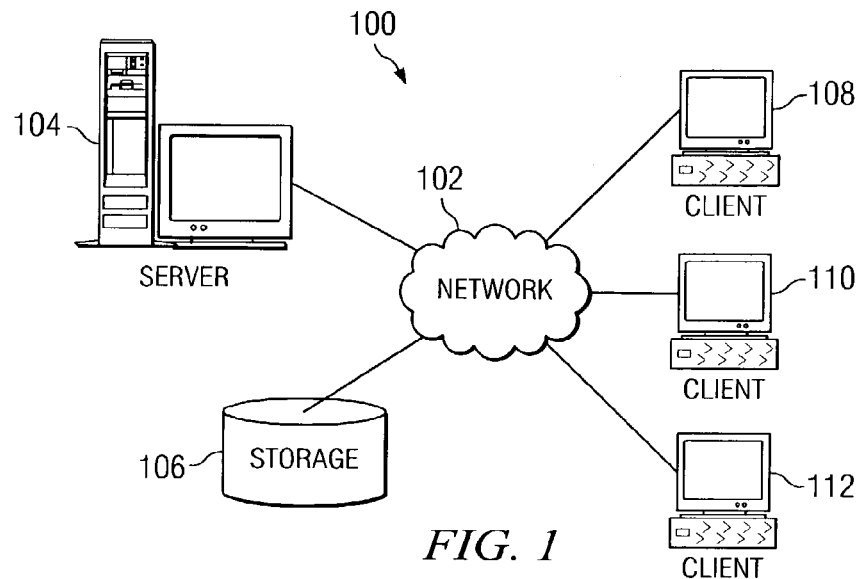
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention. The different servers and clients within network data processing system 100 are also referred to as nodes.

Figure 2:
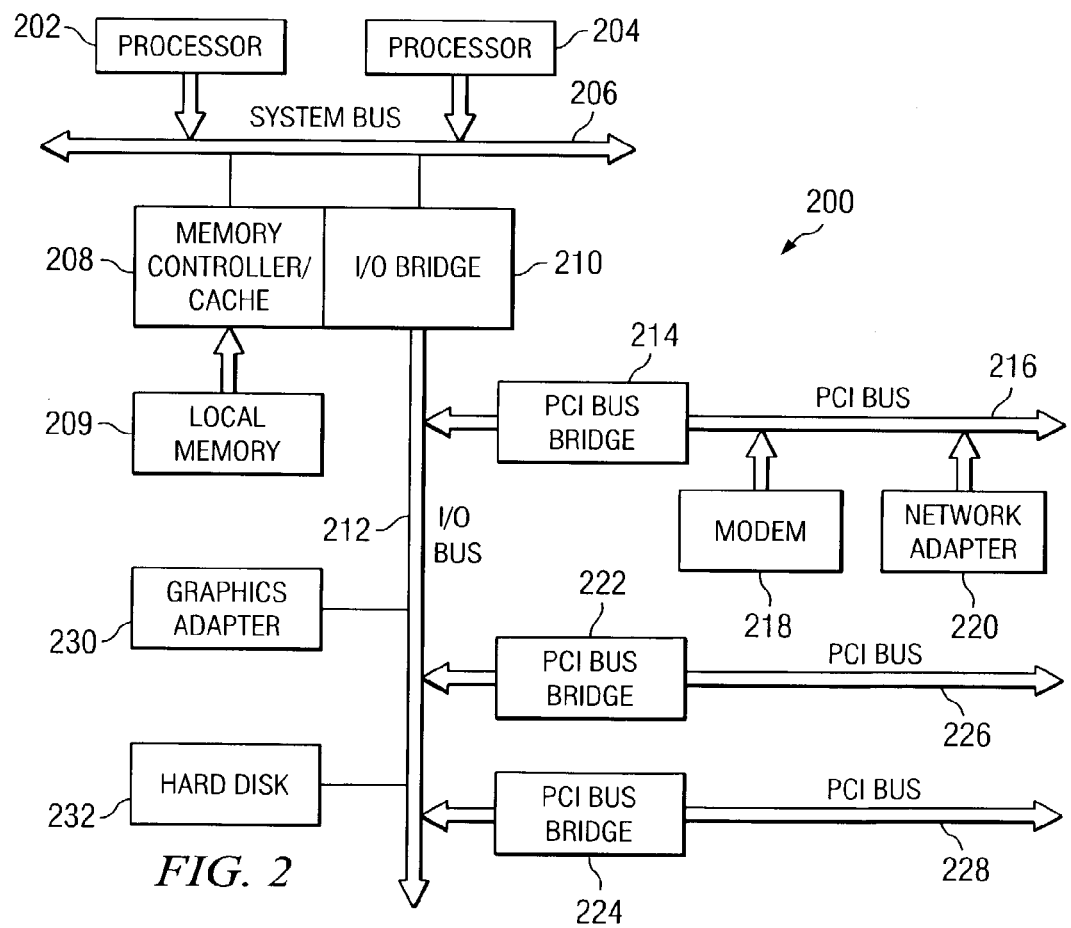
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, New York, running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. As a further example, data processing system 300 may be a personal digital assistant (PDA) device or a notebook computer.

The present invention provides a method, apparatus and computer instructions for providing addition security in a grid computing environment. In addition to using digital certificates to authorize a remote user, a mechanism of the present invention avoids problems associated with stolen user pass-phrases by including an additional security check with respect to the application. The mechanism of the present invention in the depicted examples, calculates a digital digest for an application that is to be executed on a node. This process is performed on the node on which execution is to occur. This calculated digital digest is referenced or compared to a set of digital digests from a trusted source, such as an application catalog manager. If a match is found, the application may then execute. If a match is absent, then the application presented for execution may be fraudulent with execution of that application being denied.

With reference now to FIG. 4, a diagram illustrating components used in distributing logical units in a network data processing system is depicted in accordance with a preferred embodiment of the present invention. In this example, nodes, 400, 402, 404, 406, 408, 410, and 412 are nodes in a grid. Nodes 414, 416, and 418 are nodes that are not part of the grid. These nodes may be located in a network data processing system such as network data processing system 100 in FIG. 1. In this example, these nodes are all nodes that are part of the Internet.

In this example, node 404 may serve as a grid resource application manager (GRAM) for receiving requests and distributing applications for different nodes for execution. Node 400 receives requests from users. These requests are received when a user first signs on with a pass-phrase, attaching a digital certificate that will be associated with all programs that the user attempts to execute. An application is then selected from an execution application manager. Further, one or more nodes may be selected for execution, along with any other necessary remote resources. Node 400 then sends the digital certificate and the application to one or more nodes, such as node 408 and 410 for execution.

At these nodes, the digital certificate is checked with a certificate of authority to verify the authenticity of the request. If this check is passed, the nodes form a further check by calculating a digital digest of the application. This digital digest is then compared with a set of digital digests from a trusted source. In these examples, the trusted source may be a catalog application manager (CAM) which also may be located at node 404. If a match is found, the application is then executed. Otherwise, execution of the application is denied. The set of digital digests are stored at the application catalog manager at node 404 in these examples. Alternatively, this set of digital digests may be stored elsewhere, such as, for example, at node 408 and node 410.

In this example, node 400 may be implemented using a server, such as data processing system 200 in FIG. 2. Other nodes may be implemented using a data processing system, such as data processing system 300 in FIG. 3.

Figure 5:
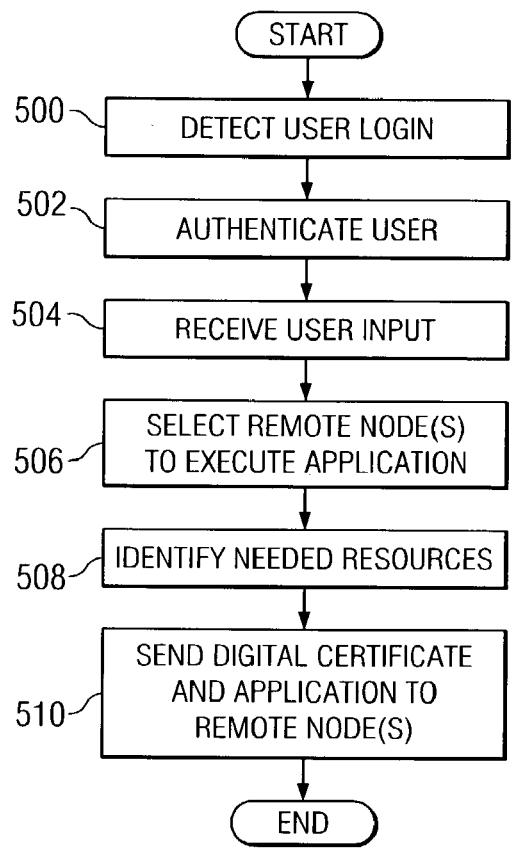
FIG. 5 is a flowchart of a process for requesting a logical unit in accordance with a preferred embodiment of the present invention.

Turning next to FIG. 5, a flowchart of a process for requesting a logical unit is depicted in accordance with a preferred embodiment of the present invention. The process illustrated in FIG. 5 may be implemented in a grid resource application manager node, such as node 404 in FIG. 4.

The process begins by detecting a user login (step 500). Thereafter, an authentication process is initiated to authenticate the user (step 502). This typically involves verifying the pass-phrase or password with the user identifier. After the user has been authenticated, the user input is received (step 504). This user input is typically one identifying an application or applications that are desired for execution. Then, a remote node or nodes are selected to execute the application (step 506). Various mechanisms may be used to select a node or nodes to execute the application. For example, a node may be selected on availability or availability and other factors such as processing power or location of the node. In these examples, the GRAM selects the node or nodes. Alternatively, the selection may be made by the user selecting the node or nodes known to the user and specifying the host name of the remote resource. Additionally, the user may specify the remote resource upon which the application will run in addition to providing the application.

Then, other needed resources are identified (step 508). For example, the application may require additional disk space or access to databases. The digital certificate associated with the user and application are then sent to the remote node or nodes for execution with the process terminating thereafter.

Figure 6:
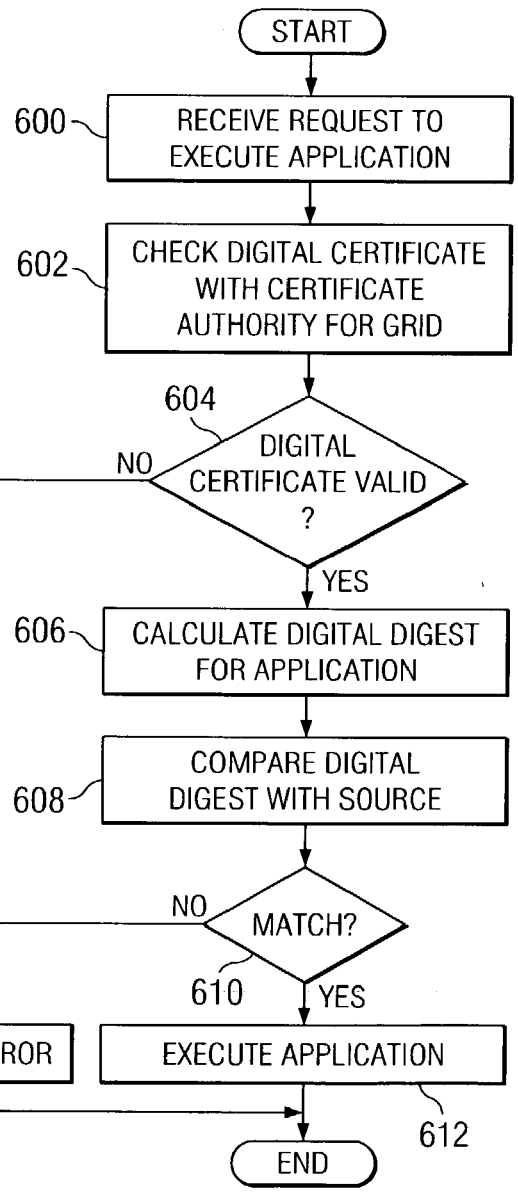
FIG. 6 is a flowchart of a process for responding to a request for a logical unit in accordance with a preferred embodiment of the present invention

With reference now to FIG. 6, a flowchart of a process for authenticating an application for execution is depicted in accordance with a preferred embodiment of the present invention. The process illustrated in FIG. 6 may be implemented within a node within a grid, such as node 410 in FIG. 4.

The process begins by receiving a request to execute an application (step 600). This request includes the application and a digital certificate in these examples. Next, the digital certificate is checked with a certificate authority for the grid (step 602). A determination is made as to whether the digital certificate is valid (step 604).

If the digital certificate is valid, a digital digest is calculated for the application (step 606). Various processes may be used to calculate a digital digest. For example, hashing routines, such as MD5 or SHA-1, may be used. The digest is a number that is calculated from the application. If a change in the application occurs, reapplication of the hashing routine results in an entirely different digest being created. With this process, the mechanism of the present invention is able to verify the integrity of an application. This calculated digital digest is compared with a digital digest from a trusted source. In these examples, the trusted source for digital digests is from an application catalog manager, which may be located at a grid node, such as node 404 in FIG. 4. Additionally, depending on the particular implementation, the digital digests from the trusted source may be stored locally at the node.

A determination is made as to whether a match is present between the calculated digital digest and the digital digests from the trusted source (step 610). If a match is present, the application is executed (step 612) with the process terminating thereafter.

Otherwise, an error is returned (step 614) with the process terminating thereafter. When a match is absent, execution of the application is denied by the node. The error return indicates that a match between the calculated digital digest and the digital digests from the trusted source did not occur. Such an error may indicate that an attempt to execute an unauthorized application may have occurred or possibly that the application may contain errors when sent to the node. With reference again to step 604, if the digital certificate is not valid, then the process also proceeds to step 614 as described above.

Thus, the present invention provides a method, apparatus, and computer instructions for authorizing the execution of applications on a node. The mechanism of the present invention provides an additional check in addition to the digital certificates normally checked in executing applications on a node in a grid. The mechanism of the present invention also checks the validity of the application by creating a digital digest from the application. This digital digest is compared to a set of digital digests of all applications that have been authorized. If a match is absent, then the application received for execution may be fraudulent or contain errors. In this manner, the mechanism of the current invention provides further security in enforcing only approved applications within a grid.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the illustrated examples are shown with respect to logical units. A mechanism of the present invention may be applied to other groupings of data, other than logical units. For example, the present invention may be applied to a single file or portions of a file depending on the particular implementation. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a grid data processing system having a plurality of nodes, for authorizing execution of an application on the grid data processing system, the method comprising:

receiving a request to execute the application by a node of the grid data processing system, wherein the request originates from a remote data processing system and is initially received by another node of the grid data processing system, and wherein the request received by the node includes a digital certificate and the application;

verifying the digital certificate in response to receiving the request;

responsive to verifying the digital certificate, calculating a digital digest for the application to form a calculated digital digest;

comparing the calculated digital digest with a set of digital digests from a trusted source; and executing the application by the node if a match between the calculated digital digest and set of digital digests occurs, wherein the another node of the grid data processing system selects the application in response to receiving the request from the remote data processing system and sends the application to the node for execution of the application by the node.

2. The method of claim 1 further comprising:

denying execution of the application if a match between the calculated digital digest and the set of digital digests fails to occur, and wherein the another node of the grid data processing system is a grid resource application manager that receives requests from a plurality of remote data processing systems and distributes applications for execution to different nodes of the grid data processing system.

3. The method of claim 1, wherein the set of digital digests is stored on the data processing system and the application is selected from an execution application manager.

4. The method of claim 1, wherein the set of digital digests is stored in a remote location from the data processing system and the application is sent to at least two nodes of the grid data processing system.

5. The method of claim 4, wherein the data processing system contacts an application catalog manager to compare the calculated digital digest with the set of digital digests.

6. The method of claim 1, wherein the set of digital digests are located in a hash table.

7. The method of claim 1, wherein the calculated digital digest is calculated using a hashing routine.

8. A grid data processing system for authorizing execution of an application on the grid data processing system, the grid data processing system, including a first node and a second node, comprising:

the first node, comprising:
a first bus system;
a first memory connected to the first bus system;
a first communications adapter connected to the first bus system; and
a first processor connected to the first bus system, wherein the first processor executes a set of instructions to receive a request through the first communications adapter that originates from a remote data processing system, select an application for execution and transmit the request, including the selected application and a digital certificate, through the first communication adapter; and the second node, comprising:
a second bus system;
a second memory connected to the second bus system;
a second communications adapter connected to the second bus system; and a second processor connected to the second bus system, wherein the second processor executes a second set of instructions to receive the request through the second communications adapter to execute the application, wherein the request is received from the first node and includes the digital certificate and the selected application;
verify the digital certificate in response to receiving the request;
calculate a digital digest for the application to form a calculated digital digest in response to verifying the digital certificate;
compare the calculated digital digest with a set of digital digests from a trusted source; and
execute the selected application if a match between the calculated digital digest and set of digital digests occurs.

9. A grid data processing system for authorizing execution of an application on the data processing system, the grid data processing system comprising:

a first node comprising first receiving means for receiving a request to execute the application, wherein the request originates from a remote data processing system;

application selecting means for selecting the application from a plurality of applications based on the request;

node selection means for selecting a node of the grid data processing system to execute the application;

a second node comprising second receiving means for receiving the request to execute the application, wherein the request includes a digital certificate and the application;

verifying means for verifying the digital certificate in response to receiving the request by the second receiving means;

calculating means, responsive to verifying the digital certificate, for calculating a digital digest for the application to form a calculated digital digest;

comparing means for comparing the calculated digital digest with a set of digital digests from a trusted source; and executing means for executing the application if a match between the calculated digital digest and set of digital digests occurs.

10. The data processing system of claim 9 further comprising:

denying means for denying execution of the application if a match between the calculated digital digest and the set of digital digests fails to occur, and wherein the another node of the grid data processing system is a grid resource application manager that receives requests from a plurality of remote data processing systems and distributes applications for execution to different nodes of the grid data processing system.

11. The data processing system of claim 9, wherein the set of digital digests is stored on the data processing system and the application is selected from an execution application manager.

12. The data processing system of claim 9, wherein the set of digital digests is stored in a remote location from the data processing system and the application is sent to at least two nodes of the grid data processing system.

13. The data processing system of claim 12, wherein the data processing system contacts an application catalog manager to compare the calculated digital digest with the set of digital digests.

14. The data processing system of claim 9, wherein the set of digital digests is located in a hash table.

15. The data processing system of claim 9, wherein the calculated digital digest is calculated using a hashing routine.

16. A computer program product in a computer readable medium for authorizing execution of an application on a grid data processing system, the computer program product comprising:

first instructions for receiving a request to execute the application, wherein the request is received from a grid resource application manager that receives requests from a plurality of remote data processing systems and distributes applications for execution to different nodes of a grid data processing system and wherein the request includes a digital certificate and the application;

second instructions for verifying the digital certificate in response to receiving the request;

third instructions, responsive to verifying the digital certificate, for calculating a digital digest for the application to form a calculated digital digest;

fourth instructions for comparing the calculated digital digest with a set of digital digests from a trusted source; and fifth instructions for executing the application if a match between the calculated digital digest and set of digital digests occurs.

17. The computer program product of claim 16 further comprising:

sixth instructions for denying execution of the application if a match between the calculated digital digest and the set of digital digests fails to occur.

18. The computer program product of claim 16, wherein the set of digital digests is stored on the grid data processing system.

19. The computer program product of claim 16, wherein the set of digital digests is stored in a remote location from the grid data processing system.

20. The computer program product of claim 19, wherein the data processing system contacts an application catalog manager to compare the calculated digital digest with the set of digital digests.

* * * * *